United States Patent Office
3,271,448
Patented Sept. 6, 1966

3,271,448
PHENOXYALKYL AMINOGUANIDINES
Joachim Augstein, Canterbury, Kent, William C. Austin, Bishops Stortford, Ronald J. Boscott, Deal, Kent, Sheila M. Green, Maidstone, Kent, and William H. Hunter, Orpington, Kent, England, assignors to Chas. Pfizer & Co., Inc., New York, N.Y., a corporation of Delaware
No Drawing. Filed Sept. 10, 1964, Ser. No. 395,588
Claims priority, application Great Britain, Mar. 15, 1962, 9,998/62; July 20, 1962, 28,075/62
11 Claims. (Cl. 260—564)

This application is a continuation-in-part of application Serial No. 264,015, as filed March 11, 1963, and now abandoned.

This invention relates to new organic compounds and their uses as new and highly effective therapeutic agents. More particularly, it relates to substituted and unsubstituted phenoxyalkyl aminoguanidines and their pharmaceutically acceptable acid addition salts.

The compounds of the present invention are aminoguanidines of the following formula:

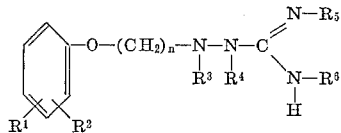

wherein $R^1$ and $R^2$ each represents a hydrogen atom, a lower alkyl or lower alkoxy i.e., containing from one to six carbon atoms, a hydroxy group or a fluorine, chlorine, bromine or iodine atom; $R^3$ and $R^4$ each represents a hydrogen atom, an alkyl group containing from one to six carbon atoms, or an acyl radical of lower fatty acid containing from one to six carbon atoms; $R^5$ and $R^6$ may be a hydrogen atom, an amino group or an alkyl group containing from one to six carbon atoms or $R^5$ and $R^6$ and the nitrogen atoms to which they are joined may form part of a heterocyclic ring system, such as imidazolo and pyrimidino, for example; and $n$ is an integer of from two to four, the group $—(CH_2)_n$ being a straight or branched chain.

The substituent groups $R^1$ and $R^2$ may be substituted at any available position in the benzene nucleus, for example, at the 2- and 6-positions relative to the position at which the alkoxy aminoguanidine moiety is attached.

Both substituted and unsubstituted compounds of the present invention are found to possess valuable therapeutic properties. The compounds are useful as potent regulators of the cardiovascular system, being especially active as anti-hypertensive agents, and in particular, being highly effective as adrenergic neurone blocking agents.

Particularly valuable for this purpose are compounds of the following formula:

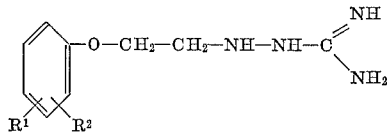

and their pharmaceutically acceptable acid addition salts, wherein $R^1$ and $R^2$ are each a member selected from the group consisting of hydrogen, hydroxy, lower alkyl, lower alkoxy and halogen.

Other especially valuable compounds for this purpose are those represented by the following formula:

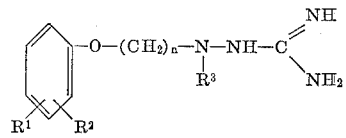

and their pharmaceutically acceptable acid addition salts, wherein $R^1$ and $R^2$ are each a member selected from the group consisting of hydrogen, hydroxy, lower alkyl, lower alkoxy and halogen; $n$ is an integer of from 2 to 4; and $R^3$ is a member selected from the group consisting of hydrogen and lower alkyl.

Also valuable as therapeutic agents are compounds represented by the formula:

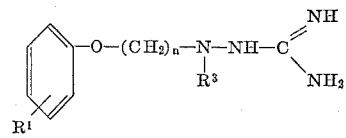

wherein $R^1$, $R^3$ and $n$ have the same significance as hereinbefore described, and their pharmaceutically acceptable acid addition salts.

Other particularly valuable compounds for this purpose are those represented by the following formula:

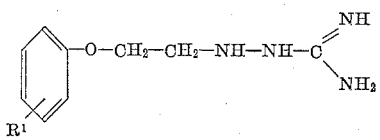

wherein $R^1$ has the same significance as hereinbefore defined, and their pharmaceutically acceptable acid addition salts.

The compounds of this invention may be prepared by reacting a phenoxyalkyl halide having the formula:

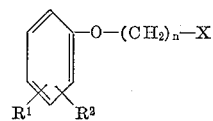

wherein $R^1$, $R^2$ and $n$ have the same significance as hereinbefore disclosed and X is an atom of chlorine, bromine or iodine, with hydrazine and reacting the resulting phenoxyalkyl hydrazine having the formula:

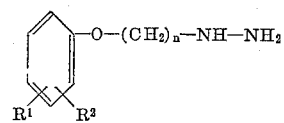

wherein $R^1$, $R^2$ and $n$ have the same significance as hereinbefore disclosed, with an S-alkylisothiouronium salt in a suitable solvent. Suitable solvents include the lower alkanols, those, for example, containing up to five carbon atoms such as methanol, ethanol, propanol, etc., dimethylsulfoxide, dimethylformamide and mixtures of these with water. The reaction is effected by maintaining the reactants in the chosen solvent or solvent mixture at a temperature of from about 20° to 200° C. for a period of from about 4 hours to about 72 hours. In preferred operations, the reaction temperature is from about 50° to about 150° C. for a period of about 20 to about 40 hours. More specifically, the phenoxyalkyl halide is reacted with hydrazine in a solvent such as 95% ethanol at reflux temperatures for a period of about 20 hours. The solvent and excess hydrazine are removed by distillation, and the residual oil is made alkaline with aqueous sodium hydroxide solution and is extracted with chloroform. The chloroform is removed by distillation and the residue is dried. The product, a phenoxyalkyl hydrazine, is then reacted with an S-alkylisothiouronium salt in water at about 100° C. for a period of about 4 to 6 hours. The water is removed by distillation at reduced pressures and the residual solid recrystallized from a suitable solvent or mixture of solvents such as water, ethanol, and the like, to yield the product, a substituted phenoxyalkyl aminoguanidine.

The phenoxyalkyl halides used in the preparation of the compounds of the instant invention are old compounds and are readily made according to procedures known in the art. One method of preparing these compounds is set forth hereinbelow under Procedure A.

PROCEDURE A

Fifty-seven grams of 2,6-dichlorophenol and 79.5 grams of dibromoethane are heated together to 100° C. A solution of 14.1 grams of sodium hydroxide in 350 ml. of water is then added over a period of one hour and the resultant mixture is subsequently stirred and heated under reflux conditions until the pH value is approximately pH 7.0.

The product is then extracted with diethyl ether, and the ether extract washed with several portions of 2N sodium hydroxide solutions and then with water. After drying over anhydrous magnesium sulfate and filtering to remove same, the product is freed from solvent by distillation. The residual oil is then fractionally distilled at 0.6 millimeter of mercury pressure to afford 58.5 grams of the fraction boiling at 100–101° C. This was subsequently found to be 2-(2,6-dichlorophenoxy)ethyl bromide.

Other methods may be used to prepare the compounds of this invention. For example, they may be prepared by reacting a substituted phenoxyalkyl hydrazine with cyanamide or with substituted isothioureas. Also, they may be prepared by condensing a corresponding substituted aliphatic aldehyde with aminoguanidine and subsequently reducing the guanylhydrazones thus produced. Still another method of preparing the compounds of the instant invention is to react the substituted phenoxyalkyl hydrazine with cyanogen halide, followed by reaction of the resultant product with an amine.

For purposes of illustration, the compounds of the present invention may be prepared by the following general reactions:

The acid addition salt which is obtained by the reaction illustrated above may be converted to the free base by dissolving it in water and neutralizing the acid with a suitable alkaline reagent such as sodium hydroxide. The free base may be isolated from the water by extraction with an immiscible organic solvent preferably one of low volatility such as methylene chloride.

The acids which are used to prepare the pharmaceutically acceptable acid addition salts of the aforementioned phenoxyalkyl aminoguanidines of this invention are those which form non-toxic acid addition salts containing pharmaceutically acceptable anions, such as the hydrochloride, hydrobromide, hydroiodide, nitrate, sulfate or bisulfate, phosphate or acid phosphate, acetate, lactate, citrate or acid citrate, tartrate or bitartrate, oxalate, succinate, maleate, gluconate and saccharate salts.

The compounds of this invention may be administered alone but are generally administered as a composition with a pharmaceutical carrier selected on the basis of the chosen route of administration and standard pharmaceutical practice. For example, they may be administered orally in the form of tablets containing such excipients as starch, milk sugar, certain types of clay, etc. They may be administered in capsules either alone or in admixture with the same or equivalent excipients. They may also be administered orally in the form of elixirs or oral suspensions which may contain flavoring or coloring agents. They may be injected parenterally, that is, for example, intramuscularly or subcutaneously. For parenteral administration, they are best used in the form of a sterile aqueous solution which may contain other solutes, for example, enough saline or glucose to make the solution isotonic.

Anesthetized cats receiving 1 mg./kg. body weight intravenously of N-[2-(2,6-dichlorophenoxy)ethylamino] guanidine hydrogen sulfate showed an immediate reduction in the rise of blood pressure produced by clamping of the common carotid arteries. Similar results were obtained with the intravenous injection of N-[2-(2,6-dimethylphenoxy)ethylamino]guanidine hydrogen sulfate.

Four dogs were made hypertensive experimentally, two by afferent baroreceptor denervation (neurogenic hypertension), and two by bilateral encapsulation of the kidneys with latex sheaths (nephrogenic hypertension). After three days administration at a dose level of 10 mg./kg. body weight orally in gelatin capsules of N-[2-(2,6-dimethylphenoxy)ethylamino]guanidine hydrogen suulfate, two dogs showed a satisfactory fall in blood pressure of 40 mm. mercury, one dog exhibited a mild fall in arterial pressure while the fourth dog showed no change in blood pressure. The pattern of response was not markedly altered by administration of the compound subcutaneously, instead of the oral route.

Table I shows the relaxing effect of compounds of the instant invention compared with other compounds.

TABLE I.—THE RELAXING EFFECT ON THE MEMBRANA NICTITANS OF THE CONSCIOUS CAT

| Compound | Dose, mg./kg. | Time in Hours After Injection | | | | |
|---|---|---|---|---|---|---|
| | | 2 | 20 | 44 | 72 | 960 |
| N-[2-(2,6-dimethylphenoxy)-ethylamino]guanidine hydrogen sulfate | 5 | + | ++ | + | 0 | 0 |
| N-[2-(2,6-dichlorophenoxy)-ethylamino]guanidine hydrogen sulfate | 5 | + | ++ | + | 0 | 0 |
| Bretylium | 5 | + | + | + | 0 | 0 |
| Guanethidine | 5 | ++ | ++ | + | 0 | 0 |
| N-[2-(2,6-dimethylphenoxy)-ethylamino]guanidine hydrogen sulfate | 20 | 0 | +++ | ++ | ++ | 0 |
| N-[2-(2,6-dichlorophenoxy)-ethylamino]guanidine hydrogen sulfate | 20 | + | +++ | ++ | + | 0 |
| Bretylium | 20 | ++ | +++ | ++ | + | 0 |
| Guanethidine | 20 | + | +++ | ++ | ++ | ++ |

+ = fair relaxation of membrana nictitans.
++ = good relaxation of membrana nictitans.
+++ = marked relaxation of membrana nictitans.

Further details can be seen from the following examples, which are given solely for the purpose of illustration only and are not to be construed in any way as limitations of this invention, many variations of which are possible without departing from the spirit or scope thereof. On the contrary, it is to be clearly understood that resort may be had to various other embodiments, modifications and equivalents thereof which readily suggest themselves to those skilled in the art without departing from the spirit of the present invention and/or the scope of the appended claims.

In these examples, parts by weight refer to grams and the expression bears the same relation to parts by volume as kilograms do to liters. The percentages are expressed by weight except where otherwise stated.

EXAMPLE I.—N - [2 - (2,6 - DICHLOROPHENOXY) ETHYLAMINO]GUANIDINE HYDROGEN SULFATE 20 parts by weight of 2-(2,6-dichlorophenoxy)ethyl bromide dissolved in 75 parts by volume of ethanol are slowly added with stirring to 37 parts by weight of hydrazine hydrate in 25 parts by volume of ethanol. The mixture is boiled under reflux conditions for 16 hours.

The solvent and excess hydrazine are removed by distillation under reduced pressure. Water and excess solid sodium hydroxide are added to make the mixture alkaline. The mixture is extracted with chloroform, dried over anhydrous potassium carbonate, filtered and freed from solvent by distillation. The residual oil is distilled at 1 millimeter of mercury pressure. The fraction boiling at 132° to 140° C. has a refractive index $n_D^{24}$ of 1.5665 and consists of 2-(2,6-dichlorophenoxy)ethyl hydrazine.

23 parts by weight of 2-(2,6-dichlorophenoxy)ethyl hydrazine and 14.46 parts by weight of S-methylisothiouronium sulfate in 150 parts by volume of water are boiled together under reflux conditions for 4 hours. The solid which precipitates on cooling is recrystallized from water and consists of 14.5 parts by weight of N-[2-(2,6-dichlorophenoxy)ethylamino]guanidine hydrogen sulfate having a melting point of 214° C.

EXAMPLE II.—N - [2 - (2,6-DIMETHYLPHENOXY) ETHYLAMINO]GUANIDINE HYDROGEN SULFATE 30 parts by weight of 2-(,6-dimethylphenoxy)ethyl bromide dissolved in 150 parts by volume of ethanol are slowly added, with stirring, to a solution of 65.5 parts by weight of hydrazine hydrate in 50 parts by volume of ethanol. The mixture is then heated under reflux conditions with stirring for 18 hours.

The solvent and excess hydrazine are removed by distillation at subatmospheric pressure. Water is then added to the residue followed by excess solid sodium hydroxide to render said residue alkaline. This mixture is then extracted with chloroform and the chloroform extract is subsequently dried over anhydrous potassium carbonate. After removal of the solvent by means of distillation, the residual oil is distilled and the fraction boiling at 112–120° C./0.7 mm. of mercury pressure is collected and found to contain 2-(2,6-dimethylphenoxy)ethyl hydrazine.

Nine parts by weight of 2-(2,6-dimethylphenoxy)ethyl hydrazine and 6.95 parts by weight of S-methylisothiouronium sulfate are heated together with 25 parts by volume of water under reflux conditions for 4 hours. The solvent is then removed, and the residue is twice crystallized from water yielding N-[2-(2,6-dimethylphenoxy)ethylamino] guanidine hydrogen sulfate having a melting point of 214°–216° C. The elemental composition found is:

|  | Percent |
|---|---|
| Carbon | 48.5 |
| Hydrogen | 7.1 |
| Nitrogen | 20.3 |
| Sulphur | 5.9 | and the balance accounted for by oxygen.

The calculated composition for $C_{11}H_{18}N_4O \cdot \frac{1}{2}H_2SO_4$ is:

|  | Percent |
|---|---|
| Carbon | 48.7 |
| Hydrogen | 7.1 |
| Nitrogen | 20.6 |
| Sulphur | 5.9 | and the balance accounted for by oxygen.

EXAMPLE III.—N - [2-(2,6-DIMETHYLPHENOXY) ETHYLAMINO]-N'-AMINOGUANIDINE HYDROIODIDE 5.4 parts by weight of 2-(2,6-dimethylphenoxy)ethylhydrazine and 7 parts by weight of S-methyl thiosemicarbazonium hydroiodide are heated in 10 parts by volume of dimethylformamide at 70° C. for four hours under a nitrogen atmosphere.

After cooling to room temperature, methyl alcohol and ether (1:1) are added until a solid precipitates. The solid is filtered and recrystallized from absolute ethanol to yield N - [2 - (2,6-dimethylphenoxy)ethylamino]-N'-aminoguanidine hydroiodide having a melting point of 157° to 159° C. The elemental composition found is:

|  | Percent |
|---|---|
| Carbon | 35.9 |
| Hydrogen | 5.6 |
| Nitrogen | 19.3 |
| Iodine | 34.1 | and the balance accounted for by oxygen.

The calculated composition for $C_{11}H_{19}N_5O \cdot HI$ is:

|  | Percent |
|---|---|
| Carbon | 36.2 |
| Hydrogen | 5.5 |
| Nitrogen | 19.2 |
| Iodine | 34.7 | and the balance accounted for by oxygen.

EXAMPLE IV.—N - [2-(2,5-DICHLOROPHENOXY) ETHYLAMINO]GUANIDINE HYDROGEN SULFATE 38 parts by weight of 2(2,5-dichlorophenoxy)ethyl bromide dissolved in 50 parts by volume of ethanol are slowly added with stirring to a solution of 70.5 parts by weight of hydrazine hydrate in 250 parts by volume of ethanol. The mixture is boiled under reflux conditions for 18 hours.

The solvent and excess hydrazine are removed by distillation at subatmospheric pressure. Water is added to the residue followed by the addition of solid sodium hydroxide until alkaline. The mixture is extracted with chloroform. The extract is dried over anhydrous potassium carbonate and the solvent is removed by distillation.

6.63 parts by weight of 2(2,5-dichlorophenoxy)ethyl hydrazine and 4.18 parts by weight of S-methylisothiouronium sulfate are boiled together with 25 parts by volume of aqueous ethanol under reflux conditions for 5 hours. The solvent is removed and the residue is twice crystallized from water to yield N-[2(2,5-dichlorophenoxy)ethylamino]guanidine hydrogen sulfate, having a melting point 184° to 185° C. The elemental composition found is:

|  | Percent |
|---|---|
| Carbon | 34.7 |
| Hydrogen | 4.1 |
| Nitrogen | 17.7 |
| Sulphur | 5.2 |
| Chlorine | 22.6 | and the balance accounted for by oxygen.

The calculated composition for $C_9H_{12}N_4Cl_2O \cdot \frac{1}{2}H_2SO_4$ is:

| | Percent |
|---|---|
| Carbon | 34.6 |
| Hydrogen | 4.2 |
| Nitrogen | 17.9 |
| Sulphur | 5.1 |
| Chlorine | 22.7 | and the balance accounted for by oxygen.

EXAMPLE V.—N - [2 - (3,4-DICHLOROPHENOXY) ETHYLAMINO]GUANIDINE HYDROGEN SULFATE 13.5 parts by weight of 2-(3,4-dichlorophenoxy) ethyl bromide dissolved in 30 parts by volume of ethanol are slowly added with stirring to a solution of 25 parts by weight of hydrazine hydrate in 100 parts by volume of ethanol. The mixture is boiled under reflux conditions with stirring for 18 hours. The solvent and excess hydrazine are removed by distillation at subatmospheric pressure. Water is added to the residue, followed by excess solid sodium hydroxide until alkaline. The mixture is extracted with chloroform. The extract is dried over anhydrous potassium carbonate and the solvent is removed by distillation.

The residual oil is distilled; the fraction boiling at 154° to 160° C. at 1 millimeter of mercury pressure consists of 2-(3,4-dichlorophenoxy)ethyl hydrazine.

6.05 parts by weight of 2-(3,4-dichlorophenoxy)ethyl hydrazine and 3.72 parts by weight of S-methylisothiouronium sulfate are boiled together with aqueous ethanol under reflux conditions for 5 hours. The solvent is removed by distillation and the residue is twice crystallized from aqueous ethanol. The product obtained is N-[2-(3,4-dichlorophenoxy)ethylamino]guanidine hydrogen sulfate, having a melting point 194° to 196° C. The elemental composition found is:

| | Percent |
|---|---|
| Carbon | 34.3 |
| Hydrogen | 4.2 |
| Nitrogen | 17.9 |
| Sulphur | 5.2 |
| Chlorine | 22.4 | and the balance accounted for by oxygen.

The calculated composition for $C_9H_{12}N_4Cl_2O \cdot \frac{1}{2}H_2SO_4$ is:

| | Percent |
|---|---|
| Carbon | 34.6 |
| Hydrogen | 4.2 |
| Nitrogen | 17.9 |
| Sulphur | 5.1 |
| Chlorine | 22.7 | and the balance accounted for by oxygen.

EXAMPLE VI.—N-[3-(PHENOXY)PROPYLAMINO] GUANIDINE HYDROGEN SULFATE 28 parts by weight of 3-phenoxypropyl bromide dissolved in 75 parts by volume of ethanol are slowly added with stirring to 65 parts by weight of hydrazine hydrate in 100 parts by volume of ethanol. The mixture is refluxed for 20 hours.

The solvent and excess hydrazine are removed by distillation at subatmospheric pressure. Water is added to the residue, followed by excess solid sodium hydroxide to make it alkaline. The mixture is extracted with chloroform and the extract is dried. The chloroform is removed by distillation. The residual oil is distilled; the fraction boiling at 118° to 140° C. at 0.8 to 3 millimeters of mercury pressure consists of 3-phenoxypropyl hydrazine.

12.8 parts by weight of 3-phenoxypropyl hydrazine and 10.7 parts by weight of S-methyl isothiouronium sulfate are boiled together with 25 parts by volume of water under reflux conditions for 4 hours. The solvent is removed and the residue is twice recrystallized from water yielding N-[3 - (phenoxy)propylamino]guanidine hydrogen sulfate, having a melting point 193° to 197° C. The elemental composition found is:

| | Percent |
|---|---|
| Carbon | 46.8 |
| Hydrogen | 6.6 |
| Nitrogen | 21.5 |
| Sulfur | 6.0 | and the balance accounted for by oxygen.

The calculated composition for $C_{10}H_{16}N_4O \cdot \frac{1}{2}H_2SO_4$ is:

| | Percent |
|---|---|
| Carbon | 46.7 |
| Hydrogen | 6.7 |
| Nitrogen | 21.8 |
| Sulfur | 6.2 | and the balance accounted for by oxygen.

EXAMPLE VII.—N-[2-(PHENOXY)ETHYLAMINO] GUANIDINE HYDROGEN SULFATE 26 parts by weight of 2-phenoxyethyl bromide dissolved in 50 parts by volume of ethanol are slowly added with stirring to 65 parts by weight of hydrazine hydrate in 150 parts by volume of ethanol. The mixture is boiled under reflux conditions with stirring for 20 hours.

The solvent and excess hydrazine are removed by distillation at subatmospheric pressure. Water is added to the residue followed by excess sodium hydroxide to make it alkaline. The mixture is extracted with chloroform. The extract is dried with anhydrous potassium carbonate, filtered and the solvent is removed by distillation. The residual oil is distilled, the fraction boiling at 114° C. at 1.1 millimeters of mercury pressure consists of 2-phenoxyethyl hydrazine.

5.5 parts by weight of 2-phenoxyethyl hydrazine and 5.04 parts by weight of S-methyl isothiouronium sulfate are boiled together with 40 parts by volume of water under reflux conditions for 6 hours. The solvent is removed and the residue is twice crystallized from water yielding N-[2-(phenoxy)ethylamino]guanidine hydrogen sulfate having a melting point 197° to 200° C. The elemental composition found is:

| | Percent |
|---|---|
| Carbon | 44.4 |
| Hydrogen | 6.4 |
| Nitrogen | 22.8 |
| Sulfur | 6.6 | and the balance accounted for by oxygen.

The calculated composition for $C_9H_{14}N_4O \cdot \frac{1}{2}H_2SO_4$ is:

| | Percent |
|---|---|
| Carbon | 44.4 |
| Hydrogen | 6.2 |
| Nitrogen | 23.0 |
| Sulfur | 6.6 | and the balance accounted for by oxygen.

EXAMPLE VIII.—N-[2-(2,6-DICHLOROPHENOXY) ETHYLAMINO]GUANIDINE

The free base is prepared by dissolving 10 g. of N-[2-(2,6-dichlorophenoxy)ethylamino]guanidine hydrogen sulfate of Example I in 50 ml. of water and the solution neutralized with 0.1 N sodium hydroxide. The free base is then extracted with several portions of methylene chloride. Concentration of the methylene chloride solution yields the product, N-[2-(2,6-dichlorophenoxy) ethylamino]guanidine.

EXAMPLE IX.—N - [2 - (o - METHOXYPHENOXY) ETHYLAMINO]GUANIDINE HYDROGEN SULFATE

Ninety-three parts by weight of 2-(o-methoxyphenoxy) ethyl chloride are added slowly to a mixture of 150 parts by weight of hydrazine hydrate and 500 parts by volume of 95% ethanol. After the addition is complete, the mixture is heated under reflux for 18 hours.

The solvent and excess hydrazine are removed by distillation and the residual oil is treated with 50% aqueous sodium hydroxide solution and extracted with chloroform. The extract obtained is dried over anhydrous magnesium sulfate and the solution is filtered. The solvent is removed by distillation and the residual oil is distilled under reduced pressure. The product obtained is 2-(o-methoxyphenoxy)ethyl hydrazine having a boiling point of 126° C. at 4 mm. of mercury pressure.

9.7 parts by weight of 2-(o-methoxyphenoxy)ethyl hydrazine and 7.35 parts by weight of S-methylisothiouronium sulfate are dissolved in 75 parts by volume of water and the solution is heated at 100° C. for 4 hours. The water is removed by distillation at reduced pressures and the residual solid is recrystallized twice from 95% ethanol. Further crystallization from a mixture of water and acetone yields N-[2-(o-methoxyphenoxy)ethylamino]guanidine hydrogen sulfate having a melting point of 142°–146° C. The elemental analysis calculated for $C_{10}H_{16}N_4O_2 \cdot \frac{1}{2}H_2SO_4$ is: 44.0% carbon, 6.3% hydrogen, 20.5% nitrogen, 5.9% sulfur and the balance accounted for by oxygen. The analysis found is: 44.0% carbon, 6.3% hydrogen, 20.2% nitrogen, 6.0% sulfur and the balance accounted for by oxygen.

EXAMPLE X.—N - [2 - (o - METHYLPHENOXY) ETHYLAMINO]GUANIDINE HYDROGEN SULFATE

Following the procedure of Example IX, 85 parts by weight of 2-(o-methylphenoxy)ethyl chloride are reacted with 150 parts by weight of hydrazine hydrate. 8.8 parts by weight of the resultant 2-(o-methylphenoxy)ethyl hydrazine are then reacted with 7.35 parts by weight of S-methylisothiouronium sulfate to yield N-[2-(o-methylphenoxy)ethylamino]guanidine hydrogen sulfate as a crystalline solid.

EXAMPLE XI.—N-[2-(o-METHOXYPHENOXY) ETHYLAMINO]GUANIDINE

The free base is prepared by dissolving 10 g. of N-[2-(o-methoxyphenoxy)ethylamino]guanidine hydrogen sulfate of Example IX in 50 ml. of water and the solution neutralized with 0.1 N sodium hydroxide. The free base is then extracted with several portions of methylene chloride. Concentration of the methylene chloride solution yields the product, N-[2-(o-methoxyphenoxy)ethylamino]guanidine.

EXAMPLE XII.—N - [2 - (o - CHLOROPHENOXY) ETHYLAMINO]GUANIDINE HYDROGEN SULFATE

Following the procedure of Example IX, 2-(o-chlorophenoxy)ethyl chloride is reacted with hydrazine hydrate to form the substituted hydrazine. The substituted hydrazine is then further reacted with S-methylisothiouronium sulfate to yield N-[2-(o-chlorophenoxy)ethylamine]guanidine hydrogen sulfate.

EXAMPLE XIII.—N-[2-(o-METHOXYPHENOXY) ETHYLAMINO]GUANIDINE HYDROCHLORIDE

Following the procedure of Example IX, 2-(o-methoxyphenoxy)ethyl chloride is reacted with hydrazine hydrate to form the substituted hydrazine. The substituted hydrazine is then further reacted with S-methylisothiouronium hydrochloride. N-[2-(o-methoxyphenoxy)ethylamino]guanidine hydrochloride is obtained as a crystalline solid.

EXAMPLE XIV.—N - [2 -(m-METHOXYPHENOXY) ETHYLAMINO]GUANIDINE HYDROGEN SULFATE

Twenty parts by weight of 2-(m-methoxyphenoxy) ethyl bromide in 50 ml. of ethanol were added slowly with stirring at room temperature to 43.3 parts by weight of hydrazine hydrate in 75 ml. of 95% ethanol. After the addition was complete, the mixture was refluxed for 20 hours. The solvent and excess hydrazine were then removed by distillation under reduced pressure. After cooling, water was added to the residue, followed by excess solid sodium hydroxide. This mixture was then extracted with chloroform, the chloroform extract dried over anhydrous magnesium sulphate and the solvent removed therefrom by distillation. The residual oil thus obtained was distilled under reduced pressure to yield 2-(m-methoxyphenoxy)ethyl hydrazine having a boiling point of 136–150° C./0.5–1.5 mm. Hg.

Nine parts by weight of 2-(m-methoxyphenoxy)ethyl hydrazine and 6.9 parts by weight of S-methylisothiouronium sulphate were then refluxed together in 20 ml. of water for 2.5 hours. On standing, a solid soon precipitated and this was filtered. After two crystallizations from water, N - [2 - (m-methoxyphenoxy)ethylamino] guanidine hydrogen sulphate was obtained, having a melting point of 197–200° C. and an elementary composition of $C_{20}H_{34}N_8O_8S$.

Calculated: C, 43.95; H, 6.27; N, 20.50; S, 5.87. Found: C, 43.98; H, 6.26; N, 20.70; S, 5.57.

EXAMPLE XV.—N - [2 - (p-METHOXYPHENOXY) ETHYLAMINO]GUANIDINE HYDROGEN SULFATE

Twenty-two parts by weight of 2-(p-methoxyphenoxy) ethyl bromide dissolved in 150 ml. of ethanol were added slowly with stirring to 47.5 parts by weight of hydrazine hydrate in 50 ml. of 95% ethanol at room temperature. After the addition was complete, the mixture was refluxed for 20 hours. The solvent and excess hydrazine were thereafter removed under reduced pressure. Upon cooling, water was added to the residue, followed by excess solid sodium hydroxide. The mixture was then extracted several times with chloroform. The chloroform extracts were subsequently dried over anhydrous potassium carbonate, and the solvent was removed by distillation. The product obtained was 2-(p-methoxyphenoxy)ethyl hydrazine having a boiling point of 114–130° C./0.5 mm. Hg. The product solidified on standing.

4.7 parts by weight of 2-(p-methoxyphenoxy)ethyl hydrazine and 3.6 parts by weight of S-methylisothiuronium sulphate were then refluxed together in 15 ml. of water for five hours. A solid precipitated on standing and this material was subsequently filtered. After two crystallisations from water, N-[2-(p-methoxyphenoxy)ethylamino]guanidine sulphate was obtained, having melting point of 178–181° C. and an elementary composition of $C_{20}H_{34}N_8O_8S$.

Calculated: C, 43.95; H, 6.27; S, 5.87. Found: C, 43.89; H, 6.36; S, 5.66.

EXAMPLE XVI.—N-METHYL-N'-[2-(o-METHOXYPHENOXY)ETHYLAMINO]GUANIDINE HYDROGEN IODIDE

Five parts by weight 2-(o-methoxyphenoxy)ethyl hydrazine and 6.35 parts by weight of N-methyl-S-methyl-isothiouronium hydroidide were refluxed in 10 ml. of water for 3 hours. The solvent was thereafter removed by means of distillation under reduced pressure. The residue was then crystallised from ethanol-ether and after further crystallisations from ethanol, N-methyl-N'-[2-(o-methoxyphenoxy)ethylamino]guanidine hydroidide was obtained, having a melting point of 150–152° C. and an elementary composition of $C_{11}H_{19}N_4O_2I$.

Calculated: C, 36.08; H, 5.23; N, 15.30; I, 34.65. Found: C, 35.83; H, 5.23; N, 15.44; I, 34.30.

EXAMPLE XVII.—N,N' - DIMETHYL - N" - [2- o - METHOXYPHENOXY)ETHYLAMINO]GUANIDINE]HYDROGEN IODIDE

Five parts by weight of 2-(o-methoxyphenoxy)ethyl hydrazine and 7 parts by weight of N,N'-dimethyl-S- methylisothiouronium hydroiodide were refluxed in 15 ml. of water for 3 hours. The solvent was then removed by distillation under reduced pressure and the residue crystallised from ethanol-ether and then acetone-ether. After a final crystallisation from water, N,N'-dimethyl-N"-[2-(o-methoxyphenoxy)ethylamino]guanidine hydroiodide was obtained, having a melting point of 142–3° C. and an elementary composition of $C_{12}H_{21}N_4O_2I$.

Calculated: C, 37.90; H, 5.57; I, 33.38. Found: C, 38.17; H, 5.49; I, 33.15.

EXAMPLE XVIII.—N - [2 - (o-METHYLPHENOXY) ETHYLAMINO]GUANIDINE HYDROGEN SULFATE

Forty-three parts by weight of 2-(o-methylphenoxy) ethyl bromide dissolved in 75 ml. of ethanol was slowly added with stirring to a solution of 100 g. of hydrazine hydrate in 150 ml. of ethanol at room temperature. After the addition was complete, the mixture was refluxed for 20 hours. The solvent and excess hydrazine were then removed under reduced pressure and water was added to the residue, followed by excess solid sodium hydroxide. The mixture was subsequently extracted with chloroform several times, the chloroform extracts dried over potassium carbonate and the solvent removed therefrom by distillation. The residual oil was then distilled under reduced pressure to give 2-(o-methylphenoxy)ethyl hydrazine having a boiling point of 102–105° C./0.5 mm.

11.1 parts by weight of 2-(o-methylphenoxy)ethyl hydrazine and 9.3 parts by weight of S-methylisothiouronium sulfate were refluxed in 25 ml. of water for 2 hours. On cooling, a solid precipitated which after several crystallisations from water gave the product N-[2-(o-methylphenoxy)ethylamino]guanidine sulfate, having a melting point of 193–195° C. and an elementary composition of $C_{20}H_{34}N_8O_6S$.

Calculated: C, 46.68; H, 6.65; N, 21.87. Found: C, 46.63; H, 6.65; N, 21.28.

EXAMPLE XIX.—N - [3 - (o-METHOXYPHENOXY) PROPYLAMINO]GUANIDINE HYDROGEN SULFATE

Forty parts by weight 3-(o-methoxyphenoxy)propyl bromide dissolved in 150 ml. of ethanol were slowly added to 81.5 parts by weight of hydrazine hydrate dissolved in 100 ml. ethanol with stirring at room temperature. After the addition was complete, the mixture was refluxed for 20 hours. The solvent and excess hydrazine were then removed under reduced pressure and water was added to the residue, followed by excess solid sodium hydroxide. The mixture was then extracted with chloroform several times, the chloroform dried over potassium carbonate and then removed by distillation. The residual oil thus obtained was then distilled under reduced pressure to afford a product that was 3-(o-methoxyphenoxy) propyl hydrazine, having a boiling point of 120–121° C./1.75 mm. Hg.

5.88 parts by weight of 3-(o-methoxyphenoxy)propyl hydrazine and 4.17 parts by weight of S-methylisothiouronium sulfate were refluxed together in 10 ml. water containing a little ethanol for a four hour period. On cooling, a solid soon precipitated which was subsequently collected by means of filtration. After two crystallisations from water N-[3-(o-methoxyphenoxy)propylamino]guanidine sulphate was obtained, having a melting point of 168–170° C. and an elementary composition of $C_{22}H_{38}N_8SO_8$.

Calculated: C, 45.97; H, 6.67; N, 20.43. Found: C, 45.94; H, 6.47; N, 20.15.

EXAMPLE XX.—N - [4 - (o-METHOXYPHENOXY) BUTYLAMINO]GUANIDINE HYDROGEN SULFATE 51.8 parts by weight of 4-(o-methoxyphenoxy)butyl bromide dissolved in 100 ml. of ethanol were slowly added with stirring to 100 parts by weight of hydrazine hydrate in 150 ml. ethanol at room temperature. The mixture was then refluxed for 20 hours. The solvent and excess hydrazine were then removed by distillation under reduced pressure and water was added to the residue, followed by excess solid sodium hydroxide. This residue was then extracted several times with chloroform, which was subsequently dried over potassium carbonate and the solvent thereafter removed therefrom by means of distillation. From the residual oil and oxalate was prepared by adding a solution of the oil in ethanol to excess oxalic acid in ethanol. The oxalate was then re-basified using strong sodium hydroxide solution and extracted with chloroform. The residual 4-(o-methoxyphenoxy)butyl hydrazine was used as such without any further purification.

Sixty-two parts by weight of 4-(o-methoxyphenoxy) butyl hydrazine and 4.1 parts by weight of S-methylisothiouronium sulfate were refluxed together in 20 ml. of aqueous ethanol for 4.5 hours. A solid soon precipitated on standing, which after several crystallisations from water or aqueous ethanol finally gave from water N-[4-(o-methoxyphenoxy)butylamino]guanidine sulfate having a melting point of 139–141° C. and an elementary composition of $C_{24}H_{42}N_8O_8S$.

Calculated: C, 47.83; H, 7.03; N, 18.60; S, 5.32. Found: C, 47.64; H, 7.17; N, 18.47; S, 5.21.

EXAMPLE XXI.—N,N' - DIAMINO - N" - [2-(2,6-DIMETHYLPHENOXY)ETHYLAMINO] GUANIDINE HYDROGEN IODIDE 3.6 parts by weight of 2-(2,6-dimethylphenoxy)ethylhydrazine and 4.96 parts by weight of S-methyl-thiocarbohydrazide hydrogen iodide were heated to 100° C. in 15 ml. of dimethylformamide for 4 hours in an atmosphere of nitrogen. A little methanol was then added to the cooled solution followed by a quantity of diethyl ether. The solid which precipitated was dissolved in methanol. The small quantity of material which deposited on cooling was discarded, and the mother liquor was allowed to stand at room temperature after the addition of further ether. The solid thus obtained was crystallised from absolute ethanol and after a further crystallisation from water, N,N'-diamino-N"-[2-(2,6-dimethylphenoxy)ethylamino]guanidine hydrogen iodide was obtained having a melting point of 144–146° C. and an elementary composition of $C_{11}H_{21}IN_6O$.

Calculated: C, 34.74; H, 5.57; N, 22.11; I, 33.38. Found: C, 34.68; H, 5.54; N, 22.32; I, 33.38.

EXAMPLE XXII.—N,N'-DIMETHYL - N"-[2-(2,6-DIMETHYLPHENOXY)ETHYLAMINO] GUANIDINE HYDROGEN IODIDE 3.6 parts by weight of 2-(2,6-dimethylphenoxy)ethylhydrazine and 4.96 parts by weight of N,N'-dimethyl-S-methylisothiouronium hydrogen iodide were refluxed together in 20 ml. absolute ethanol for 7 hours.

Some of the solvent was removed by distillation. On addition of diethyl ether to the mixture, an oil precipitated which soon solidified. This material was then recrystallised several times from water and finally yielded N,N'-dimethyl-N"-[2-(2,6-dimethylphenoxy)ethylamino] guanidine hydrogen iodide, having a melting point of 143–144° C. and an elementary composition of $C_{13}H_{23}IN_4O$.

Calculated: C, 41.27; H, 6.13; N, 14.81; I, 35.55. Found: C, 41.30; H, 6.25; N, 14.52; I, 33.57.

EXAMPLE XXIII.—N-METHYL-N'-[2-(2,6-DIMETHYLPHENOXY)ETHYLAMINO]GUANIDINE HYDROGEN DI-p-TOLUOYL TARTRATE 3.6 parts by weight of 2-(2,6-dimethylphenoxy)ethylhydrazine and 4.65 parts by weight of N-methyl-S-methylisothiouronium hydrogen iodide were refluxed together in 20 ml. absolute ethanol for 8 hours.

The solvent was removed by distillation. The residue was basified by the addition of concentrated sodium hydroxide solution and thereafter extracted with diethyl ether. After drying over anhydrous magnesium sulfate and subsequent removal of the ether, the residual oil was dissolved in ethanol and then added to a solution of di-(p-toluoyl) D-tartaric acid. The salt so formed was filtered and recrystallised from ethanol-ether. The product obtained was N-methyl-N'-[2-(2,6-dimethylphenoxy)ethylamino]guanidine hydrogen di-p-toluoyl tartrate, which had a melting point of 167–168° C. (dec.) and an elementary composition of $C_{32}H_{38}N_4O_9$.

Calculated: C, 61.72; H, 6.15; N, 9.00. Found: C, 61.56; H, 6.19; N, 8.84.

EXAMPLE XXIV. — N - [2 - (2,6 - DIMETHYLPHENOXY) - N' - METHYL - ETHYLAMINO]GUANIDINE SULFATE 67.7 parts by weight of 2-(2,6-dimethylphenoxy)ethyl bromide were slowly added during 45 minutes to 130 parts by weight of benzylamine at 120° C. with stirring. The mixture was then stirred at 140–150° C. for 3 hours. Upon cooling, the cooled mixture was basified with 2 N sodium hydroxide solution and thereafter extracted with diethyl ether. The ether layer was then washed with a saturated sodium chloride solution, dried over anhydrous magnesium sulfate, and the solvent subsequently removed by means of distillation. The residue thus obtained was then distilled at reduced pressure. The product, N-[2-(2,6-dimethylphenoxy)ethyl]benzylamine, had a boiling point of 135–140° C./0.6 mm. and a refractive index of $n_D^{25}$ 1.5518.

Thirty-six parts by weight of N-[2-(2,6-dimethylphenoxy)ethyl]benzylamine were added slowly to 16.2 parts by weight of formic acid with stirring and cooling. 13.3 parts by weight of 35% formaldehyde solution were then added. The mixture was thereafter stirred on a steam bath for 5 hours. After cooling, 15.7 ml. of concentrated hydrochloric acid were added to the mixture. The excess reagents were then removed under reduced pressure. Sodium hydroxide and benzene were added to the viscous residue, and the benzene extract was separated and shaken with dilute hydrochloric acid. The acid layer was basified with sodium hydroxide solution and then extracted with benzene. The benzene extract was subsequently dried over anhydrous magnesium sulfate and the solvent removed by distillation. The residual oil thus obtained was distilled under reduced pressure. The product, N-[2-(2,6-dimethylphenoxy)ethyl]-N-methylbenzylamine, had a boiling point of 132–137° C./0.15 mm. and a refractive index of $n_D^{25}$ 1.5425.

Thirty-three parts by weight of N-[2-(2,6-dimethylphenoxy)ethyl]-N-methylbenzylamine were dissolved in 250 ml. of glacial acetic acid and hydrogenated at atmospheric pressure using three parts by weight of 10% palladium-on-charcoal as catalyst. At the end of eight hours, the catalyst was removed by means of filtration and the acetic acid was removed by distillation under reduced pressure. The residue was then basified with sodium hydroxide solution and extracted with diethyl ether. After drying over anhydrous magnesium sulfate and subsequent removal of the ether by distillation, the residual oil thus obtained was distilled under reduced pressure to yield the product, N-[2 - (2,6 - dimethylphenoxy)ethyl]methylamine, which had a boiling point of 134–136° C./19 mm. and a refractive index of $n_D^{24}$ 1.5082.

Twelve parts by weight of N-[2-(2,6-dimethylphenoxy)ethyl]methylamine were dissolved in 67 ml. of N hydrochloric acid. A solution consisting of 4.6 parts by weight of sodium nitrite in 30 ml. of water was slowly added, with the reaction mixture being kept at 10° C. After the addition of 3 ml. of dilute hydrochloric acid, the mixture was stirred in an ice-water bath for 2 hours, during which time an oil separated. The mixture was then extracted with diethyl ether, the ether layer was dried over anhydrous magnesium sulfate and the ether subsequently removed by distillation. The residual oil thus obtained was then distilled under reduced pressure to give N-[2-(2,6-dimethylphenoxy)ethyl]-N-nitrosomethylamine, B.P. 146–148° C./0.6 mm. and a refractive index of $n_D^{23}$ 1.5279.

8.5 parts by weight of N-[2-(2,6-dimethylphenoxy)ethyl]-N-nitrosomethylamine dissolved in 50 ml of dry diethyl ether were then added slowly to a suspension of 2.28 parts by weight of lithium aluminium hydride in 75 ml. of dry ether in an atmosphere of nitrogen. The mixture was then stirred at room temperature for 3 hours. Decomposition was then effected by the successive addition of 2 ml. of water, 2 ml. of 15% sodium hydroxide solution and 6 ml. of water. The solid was removed by means of filtration and the ether removed by distillation. The residual oil thus obtained was distilled under reduced pressure, and the product, viz, N-[2-(2,6-dimethylphenoxy)ethyl]-N-methylhydrazine, had a boiling point of 82–84° C./0.15 mm., and a refractive index of $n_D^{23}$ 1.5194.

3.2 parts by weight of N-[2-(2,6-dimethylphenoxy)ethyl]-N-methylhydrazine and 2.3 parts by weight of S-methylisothiouronium sulfate were refluxed together in 10 ml. of aqueous ethanol for 7 hours. The solvent was then removed by distillation and the residue became solid on trituration with absolute alcohol. This solid material, after two crystallisations from water, gave N-[2-(2,6 - dimethylphenoxy)-N'-methylethylamino]guanidine sulfate having a melting point of 222–224° C. and an elementary composition of $C_{24}H_{42}N_8O_6S$.

Calculated: C, 50.51; H, 7.42; N, 19.64; S, 5.62. Found: C, 50.20; H, 7.25; N, 19.40; S, 5.65.

EXAMPLE XXV.—N - [3 - (2,6 - DIMETHYLPHENOXY)PROPYLAMINO]GUANIDINE SULFATE

Forty-seven parts by weight of 3-(2,6-dimethylphenoxy)propyl bromide dissolved in 300 ml. of ethanol were slowly added with stirring at room temperature to 96.5 parts by weight of hydrazine hydrate in 100 ml. of ethanol. The mixture was then refluxed for 18 hours, and the ethanol and excess hydrazine were thereafter removed under reduced pressure. Water was then added to the residue, followed by excess solid sodium hydroxide and this residual material was then extracted three times with chloroform. After drying the chloroform extracts over potassium carbonate, the solvent was removed by distillation.

9.7 parts by weight of the crude product, 3-[2,6-dimethylphenoxy]propyl hydrazine and 6.95 parts by weight S-methylisothiouronium sulfate were refluxed together in 20 ml. of aqueous ethanol for 7 hours. The solvent was then removed under reduced pressure by distillation, and the residue was crystallised from absolute ethanol and then from water. In this manner, N-[3-(2,6 - dimethylphenoxy)propylamino]guanidine sulfate was obtained, having a melting point of 182–184° C., and an elementary composition of $C_{24}H_{42}N_8O_6S$.

Calculated: C, 50.51; H, 7.42; N, 19.64; S, 5.62. Found: C, 50.30; H, 7.45; N, 19.40; S, 5.42.

EXAMPLE XXVI.—N - [2 - (3,5 - DIMETHYLPHENOXY)ETHYLAMINO]GUANIDINE SULFATE

Ten parts by weight of 2-(3,5-dimethylphenoxy)ethyl bromide dissolved in 40 ml. of ethanol were slowly added with stirring to 21.5 parts by weight of hydrazine hydrate dissolved in 75 ml. of ethanol at room temperature. The mixture was then refluxed for 18 hours, and the solvent and excess hydrazine thereafter removed under reduced pressure. Water, followed by excess solid sodium hydroxide, was added to the residue and this residual material was then extracted several times with chloroform. The chloroform extracts were dried over potassium carbonate and the solvent removed therefrom by distillation. The residual oil thus obtained was used as such in the next step without any further purification being necessary.

8.2 parts by weight of 2-(3,5-dimethylphenoxy)ethylhydrazine, dissolved in 75 ml. of ethanol and 6.4 parts by weight of S-methylisothiouronium sulfate dissolved in 75 ml. of water were refluxed together for seven hours. The solvent was then removed under reduced pressure by distillation. After refluxing the residue with diethyl ether for one hour, the solid was removed by means of filtration and washed thoroughly with water and ethanol. After several crystallisations from glacial acetic acid, N - [2-(3,5-dimethylphenoxy)ethylamino]guanidine sulfate was obtained, having a melting point of 208.5–210° C. and an elementary composition of $C_{22}H_{38}N_8O_6S$.

Calculated: C, 48.67; H, 7.06; N, 20.65; S, 5.91. Found: C, 48.72; H, 7.18; N, 20.37; S, 5.84.

EXAMPLE XXVII.—N - [2 - (2,3 - DIMETHYLPHENOXY)ETHYLAMINO]GUANIDINE SULFATE 19.4 parts by weight of 2-(2,3-dimethylphenoxy)ethylbromide dissolved in 50 ml. of ethanol were slowly added with stirring at room temperature to 42 parts by weight of hydrazine hydrate dissolved in 100 ml. of ethanol at room temperature. The mixture was then refluxed for 18 hours. The solvent and excess hydrazine were thereafter removed under reduced pressure. Water, followed by excess solid sodium hydroxide was added to the residue and this was extracted several times with chloroform. The chloroform extracts were dried over potassium carbonate and the solvent was removed by distillation. The residual product, 2-(2,3-dimethylphenoxy)ethyl hydrazine, was used as such in the next step without any further purification.

8.8 parts by weight of 2-(2,3-dimethylphenoxy)ethyl hydrazine dissolved in 50 ml. ethanol and 6.8 parts by weight S-methylisothiouronium sulfate dissolved in 50 ml. of water were refluxed together for 7 hours. The solvent was then removed by distillation under reduced pressure, and the residue was refluxed in diethyl ether for one hour. The solid thus obtained was then crystallised several times from glacial acetic acid, and several times from water. The product, N-[2-(2,3-dimethylphenoxy)ethylamino]guanidine sulfate, had a melting point of 212–214° C. and an elementary composition of $C_{22}H_{38}N_8O_6S$.

Calculated: C, 48.67; H, 7.06; N, 20.65; S, 5.91. Found: C, 48.53; H, 6.92; N, 20.70; S, 6.18.

EXAMPLE XXVIII.—N-[2-(o-CHLOROPHENOXY)ETHYLAMINO]GUANIDINE SULFATE

Forty-seven parts by weight of o-chlorophenoxyethyl bromide dissolved in 100 ml. of ethanol were slowly added with stirring at room temperature to 100 parts by weight of hydrazine hydrate dissolved in 100 ml. of ethanol. The mixture was then refluxed for 20 hours. The solvent and excess hydrazine were thereafter removed by distillation under reduced pressure. A little water was then added to the cooled residue, followed by excess solid sodium hydroxide. The mixture thus obtained was extracted three times with chloroform, the chloroform extracts were dried over potassium carbonate and the solvent was removed by distillation. The residue, o-chlorophenoxyethyl hydrazine, had a boiling point of 143–144° C./2 mm.

9.33 parts by weight of o-chlorophenoxyethyl hydrazine and 6.95 parts by weight of S-methylisothiouronium sulfate were refluxed together in 25 ml. of water for two hours. On cooling, an oil separated which soon solidified. This material was removed by means of filtration and after several recrystallisations from aqueous ethanol and finally from water, gave N-[2-(o-chlorophenoxy)-ethylamino]guanidine sulfate having the following composition:

Calculated: C, 38.92; H, 5.08; N, 20.18; S, 5.77; Cl, 12.76. Found: C, 38.76; H, 4.83; N, 20.05; S, 5.46; Cl, 12.50.

EXAMPLE XXIX

The procedure of Example I is essentially followed to prepare various other phenoxyalkyl aminoguanidines, which are listed below in the table that follows. These compounds are all prepared from the appropriate phenoxyalkyl hydrazine and S-methylisothiouronium sulfate starting materials in the same manner as described before for the compounds of the previous examples.

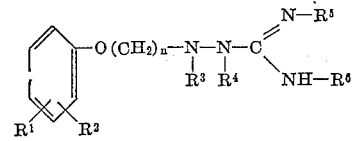

| R¹ | R² | n | R³ | R⁴ | R⁵ | R⁶ |
|---|---|---|---|---|---|---|
| H | H | 4 | C₂H₅ | H | CH₃ | CH₃ |
| H | H | 2 | H | H | H | NH₂ |
| 2-(n-C₆H₁₃) | 6-(n-C₆H₁₃) | 3 | H | H | H | H |
| H | 5-(i-C₃H₇) | 2 | H | H | C₂H₅ | C₂H₅ |
| 2-(n-C₄H₉) | 4-(n-C₄H₉) | 4 | H | CH₃ | H | H |
| 2-OCH₃ | 5-OCH₃ | 2 | H | H | H | CH₃ |
| 2-OC₂H₅ | 6-OC₂H₅ | 3 | H | H | H | H |
| H | 3-OC₃H₇(i) | 4 | CH₃ | CH₃ | H | H |
| 2-OC₆H₁₃ | 5-OC₆H₁₃ | 2 | H | H | H | H |
| 2-OH | H | 2 | CH₃ | H | H | H |
| 3-OH | 4-OH | 3 | H | C₂H₅ | H | H |
| 2-OH | H | 4 | H | H | n-C₃H₇ | n-C₃H₇ |
| 2-Br | 6-Br | 2 | H | H | H | H |
| 2-F | 6-F | 3 | H | H | H | CH₃ |
| 2-Br | H | 4 | H | H | H | NH₂ |
| H | 6-F | 2 | CH₃ | H | H | H |
| 5-I | H | 3 | H | H | H | H |
| H | H | 4 | C₂H₅ | C₂H₅ | -CH=CH- | |
| 2-Cl | H | 2 | n-C₆H₁₃ | n-C₆H₁₃ | H | H |
| H | H | 3 | CH₃ | H | CH₃ | CH₃ |
| H | 5-Cl | 3 | H | H | -CH=CH- | |
| H | H | 2 | H | H | n-C₆H₁₃ | n-C₆H₁₃ |
| 2-OCH₃ | 5-OCH₃ | 4 | H | H | NH₂ | NH₂ |
| H | H | 3 | CH₃ | H | -CH=CH- | |
| 2-OCH₃ | 6-OCH₃ | 2 | CH₃ | CH₃ | CH₃ | CH₃ |
| 2-CH₃ | 6-Cl | 3 | CH₃ | CH₃ | H | H |
| 2-Cl | 5-Cl | 2 | H | H | -CH=CH-CH₂- | |
| 2-OH | H | 2 | CH₃ | CH₃ | H | CH₃ |
| 2-(n-C₄H₉) | H | 2 | H | H | H | H |
| 2-CH₃ | H | 2 | H | H | -CH=CH- | |
| 2-OH | H | 4 | H | H | H | H |
| H | H | 2 | H | H | -CH=CH-CH₂- | |
| 2-OCH₃ | H | 2 | H | CH₃ | CH₃ | CH₃ |
| H | 5-Cl | 2 | CH₃ | H | H | H |
| 2-OCH₃ | H | 3 | CH₃ | H | -CH=CH-CH₂- | |

1. A compound selected from the class of organic bases of the formula:

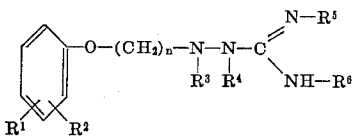

and the pharmaceutically-acceptable acid addition salts thereof, wherein $R^1$ and $R^2$ are each a member selected from the group consisting of hydrogen, hydroxy, lower alkyl, lower alkoxy and halogen; $n$ is an integer of from two to four; $R^3$ and $R^4$ are each a member selected from the group consisting of hydrogen and lower alkyl; $R^5$ and $R^6$ are each members selected from the group consisting of hydrogen, lower alkyl and amino, and when said $R^5$ and $R^6$ are taken together with the nitrogen atoms to which they are attached, they form a cyclic member selected from the group consisting of imidazolo and dihydropyrimidino.

2. A compound selected from the class of organic bases of the formula:

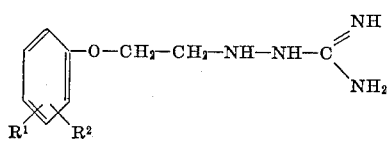

and the pharmaceutically-acceptable acid addition salts thereof, wherein $R^1$ and $R^2$ are each a member selected from the group consisting of hydrogen, hydroxy, lower alkyl, lower alkoxy and halogen.

3. A compound selected from the class of organic bases of the formula:

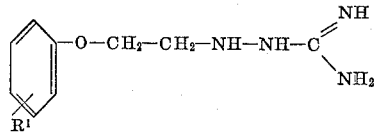

and the pharmaceutically-acceptable acid addition salts thereof, wherein $R^1$ is a member selected from the group consisting of hydrogen, hydroxy, lower alkyl, lower alkoxy and halogen.

4. N-[2-(2,6-dihalophenoxy)ethylamino]guanidine.
5. N-[2-(2,6-dichlorophenoxy)ethylamino]guanidine.
6. N-[2-(o-chlorophenoxy)ethylamino]guanidine.
7. N-[2-(2,5-dichlorophenoxy)ethylamino]guanidine.
8. N-[2-(o-methoxyphenoxy)ethylamino]guanidine.
9. N-[2-(phenoxy)ethylamino]guanidine.
10. N-[2-(2,6-dimethylphenoxy)ethylamino]guanidine.
11. N - [2 - (2,6 - dimethylphenoxy)ethylamino]-N'-aminoguanidine.

References Cited by the Examiner
UNITED STATES PATENTS
3,131,218    4/1964    Spickett et al. _____ 260—564

CHARLES B. PARKER, *Primary Examiner.*
FLOYD HIGEL, *Assistant Examiner.*